(12) United States Patent
Wang

(10) Patent No.: US 10,979,622 B2
(45) Date of Patent: Apr. 13, 2021

(54) METHOD AND SYSTEM FOR PERFORMING OBJECT DETECTION USING A CONVOLUTIONAL NEURAL NETWORK

(71) Applicant: Avigilon Corporation, Vancouver (CA)

(72) Inventor: Yin Wang, Malden, MA (US)

(73) Assignee: AVIGILON CORPORATION, Vancouver (CA)

( * ) Notice: Subject to any disclaimer, the term of this patent is extended or adjusted under 35 U.S.C. 154(b) by 91 days.

(21) Appl. No.: 16/526,711

(22) Filed: Jul. 30, 2019

(65) Prior Publication Data

US 2020/0092463 A1 Mar. 19, 2020

Related U.S. Application Data

(60) Provisional application No. 62/733,321, filed on Sep. 19, 2018.

(51) Int. Cl.
| | |
|---|---|
| *H04N 5/232* | (2006.01) |
| *G06N 3/04* | (2006.01) |
| *G06K 9/00* | (2006.01) |
| *G06F 17/15* | (2006.01) |

(52) U.S. Cl.
CPC ......... *H04N 5/23218* (2018.08); *G06F 17/15* (2013.01); *G06K 9/00664* (2013.01); *G06N 3/04* (2013.01)

(58) Field of Classification Search
CPC ................ H04N 5/23218; G06F 17/15; G06K 9/00664; G06N 3/04
See application file for complete search history.

(56) References Cited

U.S. PATENT DOCUMENTS

| | | | | |
|---|---|---|---|---|
| 10,650,280 | B2* | 5/2020 | Cox | G06K 9/6263 |
| 2002/0038294 | A1* | 3/2002 | Matsugu | G06N 3/063 |
| | | | | 706/20 |
| 2020/0356842 | A1* | 11/2020 | Guo | G06F 17/15 |

OTHER PUBLICATIONS

Jin, Pengchong, et al., "Pooling Pyramid Network for Object Detection," Google AI Perception, arXiv:1807.03284v1[cs.CV], Jul. 9, 2018, available at https://arxiv.org/pdf/1807.03284.pdf, pp. 1-3.

(Continued)

*Primary Examiner* — Utpal D Shah
(74) *Attorney, Agent, or Firm* — Perry + Currier, Inc.

(57) ABSTRACT

Methods, systems, and techniques for performing object detection using a convolutional neural network (CNN) involve obtaining an image and then processing the image using the CNN to generate a first feature pyramid and a second feature pyramid from the first pyramid. The second pyramid includes an enhanced feature map, which is generated by combining an upsampled feature map and a feature map of the first feature pyramid that has a corresponding or lower resolution of a resolution of the enhanced feature map. The upsampled feature map is generated by upsampling a feature map of the second feature pyramid that is at a shallower position in the CNN than the enhanced feature map. The enhanced feature map is split into channel feature maps of different resolutions, with each of the channel feature maps corresponding to channels of the enhanced feature map. Object detection is performed on the channel feature maps.

18 Claims, 10 Drawing Sheets

(56) References Cited

OTHER PUBLICATIONS

Chen et al., "Optimizing Video Object Detection via a Scale-Time Lattice", arXiv:1804.05472v1 [cs.CV], Apr. 16, 2018, available at http://arxiv.org/pdf/1804.05472.pdf, pp. 1-10.

Liu, S., et al., "Path Aggregation Network for Instance Segmentation," in Proceedings of the IEEE Conference on Computer Vision and Pattern Recognition, Mar. 5, 2018, pp. 8759-8768.

Fu, Cheng-Yang, et al., "DSSD: Deconvolutional Single Shot Detector," arXiv:1701.06659v1 [cs.CV], Jan. 23, 2017, available at http://arxiv.org/pdf/1701.06659.pdf, pp. 1-11.

Pinheiro, Pedro O., et al., "Learning to Refine Object Segments," arXiv:1603.08695v2 [cs.CV], Jul. 26, 2016, available at http://arxiv.org/pdf/1603.08695.pdf, pp. 1-18.

Lin, Tsung-Yi, et al., "Feature Pyramid Networks for Object Detection," Facebook AI Research (FAIR), arXiv:1612.03144v2 [cs.CV], Apr. 19, 2017, available at http://arxiv.org/pdf/1612.03144.pdf, pp. 1-10.

Liu, Wei, et al., "SSD: Single Shot MultiBox Detector," available at <https://github.com/weiliu89/caffe/tree/ssd>, Dec. 29, 2016, pp. 1-17.

Lin, Tsung-Yi, et al., "Focal Loss for Dense Object Detection," Facebook AI Research (FAIR), arXiv:1708.02002v2 [cs.CV], Feb. 7, 2018, available at http://arxiv.org/pdf/1708.02002.pdf, pp. 1-10.

Kirillov, Alexander, et al., "Panoptic Feature Pyramid Networks," Facebook AI Research (FAIR), arXiv:1901.02446v2 [cs.CV], Apr. 10, 2019, available at https://arxiv.org/abs/1901.02446, pp. 6399-6408.

International Search Report for International Application No. PCT/CA2019/051042, dated Oct. 25, 2019.

\* cited by examiner

METHOD AND SYSTEM FOR PERFORMING OBJECT DETECTION USING A CONVOLUTIONAL NEURAL NETWORK

CROSS-REFERENCE TO RELATED APPLICATION

This application claims priority to U.S. provisional patent application No. 62/733,321 filed on Sep. 19, 2018, and entitled "Method and System for Performing Object Detection using a Convolutional Neural Network", the entirety of which is hereby incorporated by reference herein.

TECHNICAL FIELD

The present subject-matter relates to methods, systems, and techniques for performing object detection using a convolutional neural network.

BACKGROUND

Computer implemented visual object detection, also called object recognition, pertains to locating and classifying visual representations of real-life objects found in still images or motion videos captured by a camera. By performing visual object detection, each visual object found in the still images or motion video is classified according to its type (such as, for example, human, vehicle, or animal).

Automated security and surveillance systems typically employ video cameras or other image capturing devices or sensors to collect image data such as video. Images represented by the image data may be displayed for contemporaneous screening by security personnel and/or recorded for later review after a security breach.

SUMMARY

According to a first aspect, there is provided a method comprising: obtaining an image; generating a first feature pyramid by processing the image using a convolutional neural network (CNN); generating a second feature pyramid from the first feature pyramid using the CNN, wherein the second feature pyramid comprises an enhanced feature map generated by combining an upsampled feature map and a feature map of the first feature pyramid that has a corresponding or lower resolution of a resolution of the enhanced feature map, and wherein the upsampled feature map is generated by upsampling a feature map of the second feature pyramid that is at a shallower position in the CNN than the enhanced feature map; splitting the enhanced feature map into channel feature maps of different resolutions, wherein each of the channel feature maps corresponds to channels of the enhanced feature map; and performing object detection on the channel feature maps.

Generating each of the feature maps of the second feature pyramid deeper than a shallowest feature map of the second feature pyramid may comprise combining an upsampled version of a feature map of the second feature pyramid that is one layer shallower than the feature map being generated, and a feature map of the first feature pyramid that has an identical resolution of the feature map being generated.

A deepest feature map of the first feature pyramid and the shallowest feature map of the second feature pyramid may be identical.

The shallowest feature map of the second feature pyramid may be generated by processing a deepest feature map of the first feature pyramid using a convolutional layer of the CNN.

The first feature pyramid and the second feature pyramid may be of identical height.

The feature map of the first feature pyramid used to generate the enhanced feature map may be at a height of the first feature pyramid that corresponds to a height of the enhanced feature map.

The enhanced feature map may be generated as a channel-wise concatenation of the upsampled feature map and the feature map of the first feature pyramid.

The enhanced feature map may be generated as an element-wise sum of the upsampled feature map and the feature map of the first feature pyramid.

Upsampling the feature map of the second feature pyramid may comprise performing a deconvolution on the feature map of the second feature pyramid.

Splitting the enhanced feature map into channel feature maps of different resolutions may comprise differently pooling feature maps that result from splitting the enhanced feature map.

Splitting the enhanced feature map into channel feature maps of different resolutions may comprise performing different convolutional operations on feature maps that result from splitting the enhanced feature map.

The channel feature maps may have identical resolutions to at least some feature maps of the second feature pyramid.

The enhanced feature map may be at a base of the second feature pyramid.

The enhanced feature map may be further generated by performing a convolution operation on a resulting feature map that results from combining the upsampled feature map and the feature map of the first feature pyramid that has a corresponding or lower resolution of a resolution of the enhanced feature map, wherein the convolution operation adjusts a number of channels of the resulting feature map.

According to another aspect, there is provided a method comprising: obtaining an image; generating at least one feature pyramid by processing the image using a convolutional neural network (CNN); splitting an enhanced feature map comprising part of the at least one feature pyramid into channel feature maps of different resolutions, wherein the CNN comprises at least one feature map that is shallower than the enhanced feature map, and wherein each of the channel feature maps corresponds to channels of the enhanced feature map; and performing object detection on the channel feature maps.

According to another aspect, there is provided a camera comprising: a housing through which extends an aperture that permits light to enter the housing; an image sensor contained within the housing to receive the light that has entered the housing through the aperture; a processor communicatively coupled to the image sensor; and a memory communicatively coupled to the processor, wherein the memory has stored thereon computer program code that is executable by the processor and that, when executed by the processor, causes the processor to perform the method of any of the foregoing aspects or suitable combinations thereof.

According to another aspect, there is provided a non-transitory computer readable medium having stored thereon computer program code that is executable by a processor and that, when executed by the processor, causes the processor to perform the method of any of the foregoing aspects or suitable combinations thereof.

According to another aspect, there is provided a camera comprising: a housing through which extends an aperture that permits light to enter the housing; an image sensor contained within the housing to receive the light that has entered the housing through the aperture; a processor communicatively coupled to the image sensor; and a memory communicatively coupled to the processor, wherein the memory has stored thereon computer program code that is executable by the processor and that, when executed by the processor, causes the processor to perform a method comprising: obtaining an image; generating a first feature pyramid by processing the image using a convolutional neural network (CNN); generating a second feature pyramid from the first feature pyramid using the CNN, wherein the second feature pyramid comprises an enhanced feature map generated by combining an upsampled feature map and a feature map of the first feature pyramid that has a corresponding or lower resolution of a resolution of the enhanced feature map, and wherein the upsampled feature map is generated by upsampling a feature map of the second feature pyramid that is at a shallower position in the CNN than the enhanced feature map; splitting the enhanced feature map into channel feature maps of different resolutions, wherein each of the channel feature maps corresponds to channels of the enhanced feature map; and performing object detection on the channel feature maps.

Generating each of the feature maps of the second feature pyramid deeper than a shallowest feature map of the second feature pyramid may comprise combining an upsampled version of a feature map of the second feature pyramid that is one layer shallower than the feature map being generated, and a feature map of the first feature pyramid that has an identical resolution of the feature map being generated.

A deepest feature map of the first feature pyramid and the shallowest feature map of the second feature pyramid may be identical.

The shallowest feature map of the second feature pyramid may be generated by processing a deepest feature map of the first feature pyramid using a convolutional layer of the CNN.

The first feature pyramid and the second feature pyramid may be of identical height.

The feature map of the first feature pyramid may be used to generate the enhanced feature map is at a height of the first feature pyramid that corresponds to a height of the enhanced feature map.

The enhanced feature map may be generated as a channel-wise concatenation of the upsampled feature map and the feature map of the first feature pyramid.

The enhanced feature map may be generated as an element-wise sum of the upsampled feature map and the feature map of the first feature pyramid.

Upsampling the feature map of the second feature pyramid may comprise performing a deconvolution on the feature map of the second feature pyramid.

Splitting the enhanced feature map into channel feature maps of different resolutions may comprise differently pooling feature maps that result from splitting the enhanced feature map.

Splitting the enhanced feature map into channel feature maps of different resolutions may comprise performing different convolutional operations on feature maps that result from splitting the enhanced feature map.

The channel feature maps may have identical resolutions to at least some feature maps of the second feature pyramid.

The enhanced feature map may be at a base of the second feature pyramid.

The enhanced feature map may be further generated by performing a convolution operation on a resulting feature map that results from combining the upsampled feature map and the feature map of the first feature pyramid that has a corresponding or lower resolution of a resolution of the enhanced feature map, wherein the convolution operation adjusts a number of channels of the resulting feature map.

According to another aspect, there is provided a camera comprising: a housing through which extends an aperture that permits light to enter the housing; an image sensor contained within the housing to receive the light that has entered the housing through the aperture; a processor communicatively coupled to the image sensor; and a memory communicatively coupled to the processor, wherein the memory has stored thereon computer program code that is executable by the processor and that, when executed by the processor, causes the processor to perform a method comprising: obtaining an image; generating at least one feature pyramid by processing the image using a convolutional neural network (CNN); splitting an enhanced feature map comprising part of the at least one feature pyramid into channel feature maps of different resolutions, wherein the CNN comprises at least one feature map that is shallower than the enhanced feature map, and wherein each of the channel feature maps corresponds to channels of the enhanced feature map; and performing object detection on the channel feature maps.

The processor and memory may be contained within the housing.

According to another aspect, there is provided a non-transitory computer readable medium having stored thereon computer program code that is executable by a processor and that, when executed by the processor, causes the processor to perform a method comprising: obtaining an image; generating a first feature pyramid by processing the image using a convolutional neural network (CNN); generating a second feature pyramid from the first feature pyramid using the CNN, wherein the second feature pyramid comprises an enhanced feature map generated by combining an upsampled feature map and a feature map of the first feature pyramid that has a corresponding or lower resolution of a resolution of the enhanced feature map, and wherein the upsampled feature map is generated by upsampling a feature map of the second feature pyramid that is at a shallower position in the CNN than the enhanced feature map; splitting the enhanced feature map into channel feature maps of different resolutions, wherein each of the channel feature maps corresponds to channels of the enhanced feature map; and performing object detection on the channel feature maps.

According to another aspect, there is provided a non-transitory computer readable medium having stored thereon computer program code that is executable by a processor and that, when executed by the processor, causes the processor to perform a method comprising: obtaining an image; generating at least one feature pyramid by processing the image using a convolutional neural network (CNN); splitting an enhanced feature map comprising part of the at least one feature pyramid into channel feature maps of different resolutions, wherein the CNN comprises at least one feature map that is shallower than the enhanced feature map, and wherein each of the channel feature maps corresponds to channels of the enhanced feature map; and performing object detection on the channel feature maps.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which.

Figure 1:
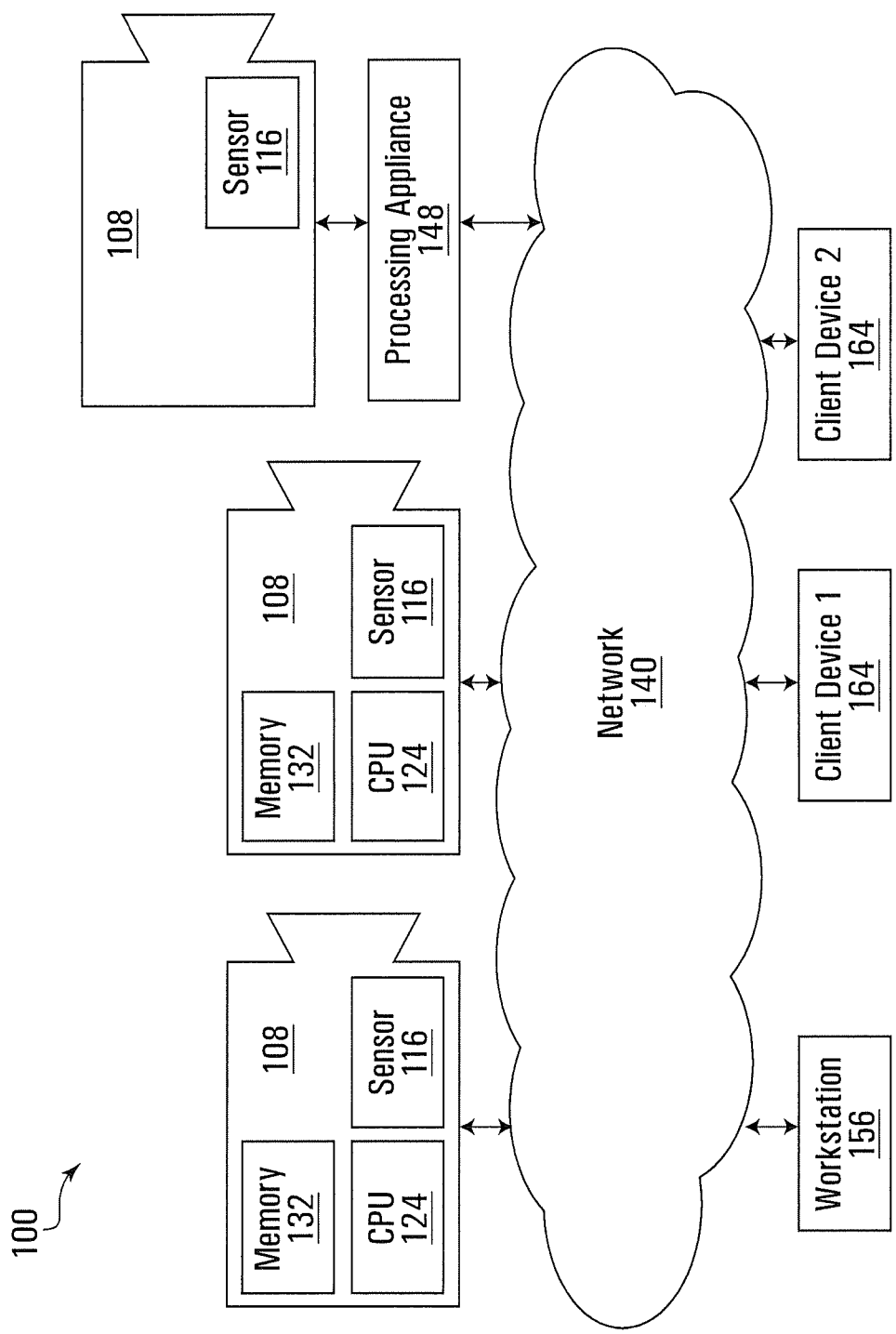
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

The term "and/or" as used herein in conjunction with a list of items means any one or more of that list of items. For example, the phrase, "A, B, and/or C" means any one or more of A, B, and C.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting and/or tracking visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit", "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes a housing through which extends an aperture that permits light to enter the housing, and at least one image sensor 116 positioned within the housing to receive the light that has entered the housing through the aperture. The at least one image sensor 116 is for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124 communicatively coupled to the at least one image sensor 116, one or more memory devices 132 communicatively coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
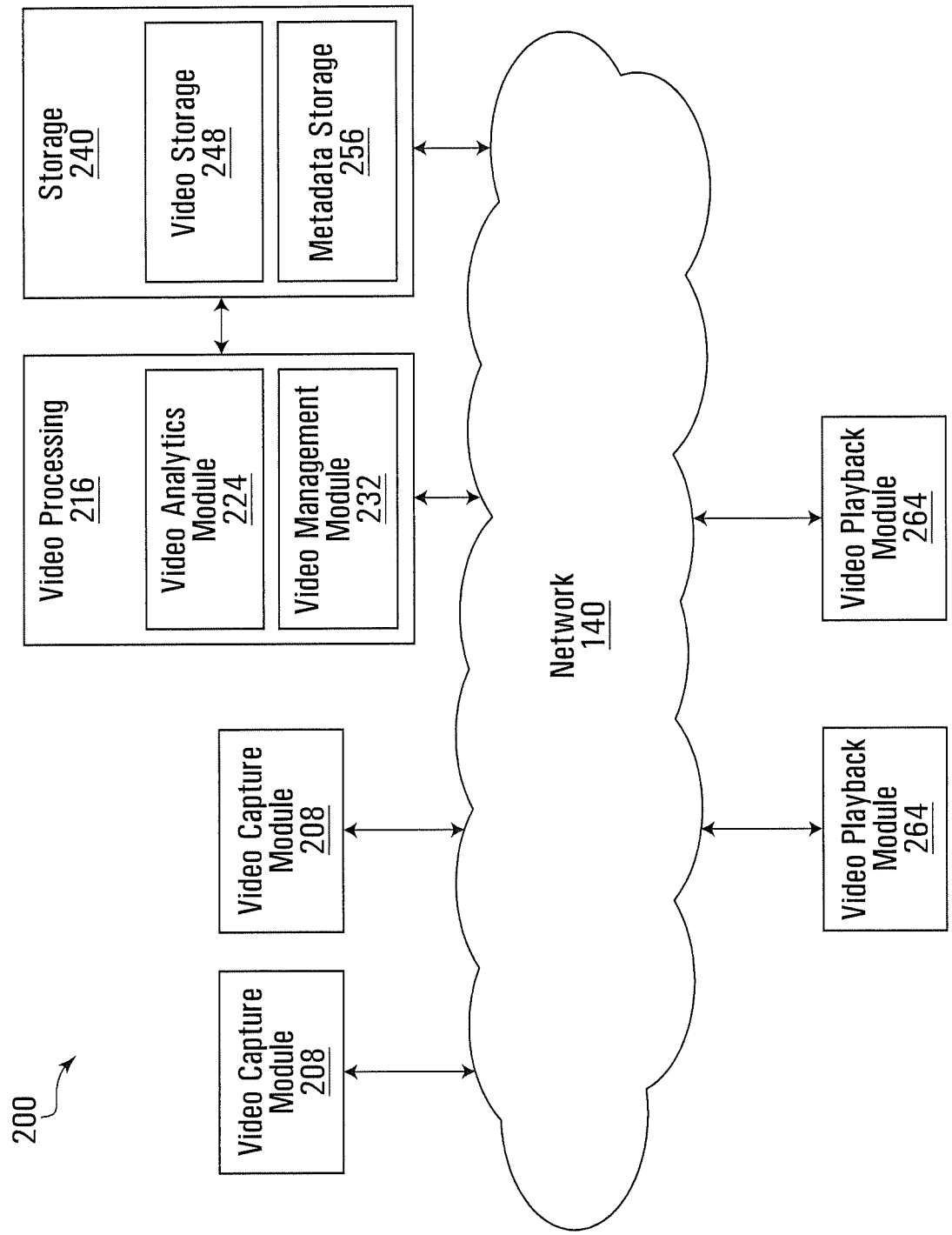
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
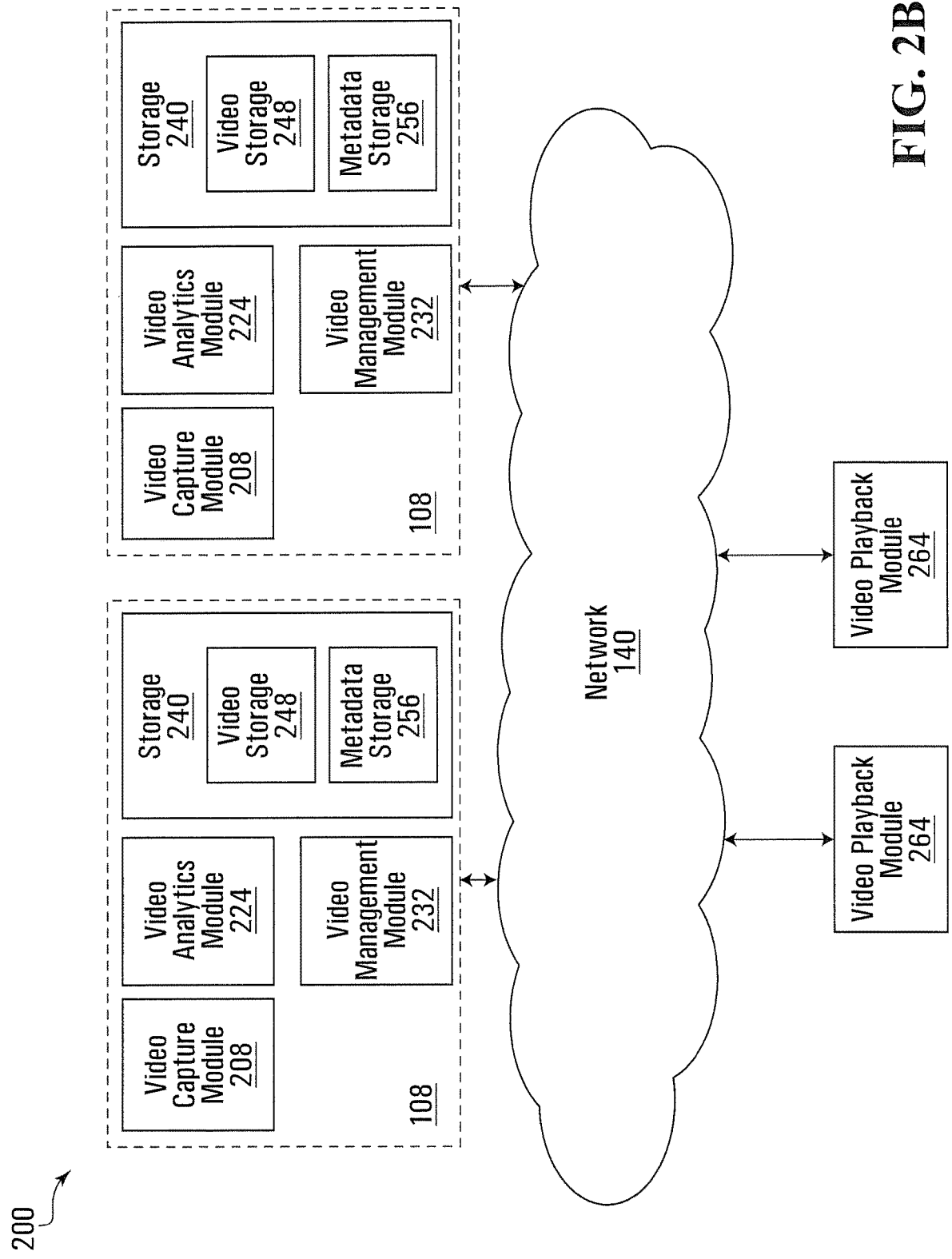
FIG. 2B illustrates a block diagram of a set of operational modules of the video capture and playback system according to one particular example embodiment wherein the video analytics module 224, the video management module 232 and the storage 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

In at least some example embodiments, the video analytics module 224, whether running on the camera 108 or not, may use a convolutional neural network (CNN) to perform object detection. One technical problem encountered with running a CNN on hardware with capabilities that are relatively limited, such as on the camera 108, in comparison to more powerful hardware, such as the workstation 156 or certain types of the client device 164, is efficiently using computational resources to enable the CNN to practically be used for real-time object detection.

Figure 5A:
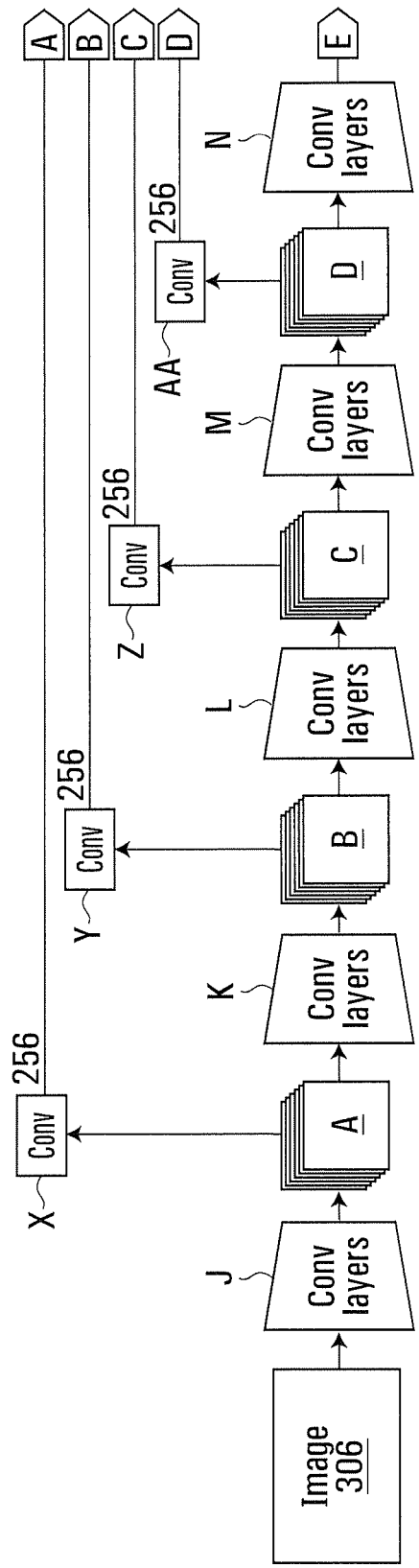
FIGS. 5A and 5B illustrate a block diagram of a conventional system for performing object detection, according to the prior art.
Figure 5B:
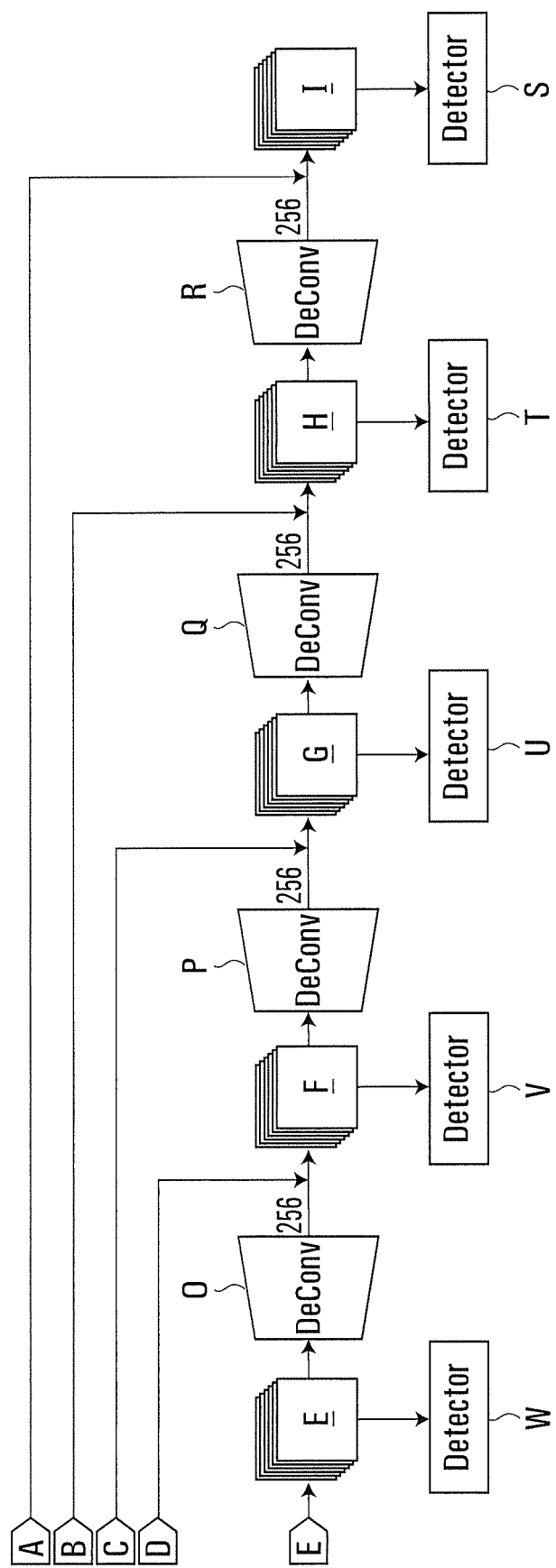

FIGS. 5A and 5B depict a deconvolutional single shot detector (DSSD), which is one example of a prior art object detector. The DSSD performs object detection on an image 306 by processing that image 306 sequentially through a series of first through fifth convolutional layers J-N and first through fourth deconvolutional layers O-R. The first through fifth convolutional layers J-N respectively output first through fifth feature maps A-E, each having a resolution represented by a height and a width, and a number of channels represented by a depth. First through fourth convolution modules X,Y,Z,AA respectively perform convolutions on the first through fourth feature maps A-D, The fifth feature map E is input to the first deconvolutional layers O, and the outputs of the first through fourth deconvolutional layers O-R are combined with the outputs of the first through fourth convolution modules X,Y,Z,AA to create sixth through ninth feature maps F-I, respectively; this combination is done using an element-wise sum. Each of the sixth through ninth feature maps F-I comprises 256 channels, and the convolution modules X,Y,Z,AA adjust the number of channels of the first through fifth feature maps A-E as necessary to 256 without changing their resolution. The sixth through eighth feature maps F-H are respectively the inputs of the second through fourth deconvolutional layers P-R. Object detection is performed on the fifth through ninth feature maps E-I. More particularly, the DSSD comprises first through fifth detector modules S-W that process the ninth through fifth feature maps I-E, respectively.

As the convolution modules X,Y,Z,AA do not change the height or width of the feature maps A-D they process, they neither upsample nor downsample their inputs. Each of the convolutional layers J-N and deconvolutional layers O-R increase the semantic strength of the feature map A-I it processes. Further, each of the convolutional layers J-N perform a downsampling operation on its input, such as a pooling operation or a convolution operation using a stride selected to result in downsampled output, with the consequence that the first through fifth feature maps A-E have progressively smaller resolutions and are used for detection of progressively larger objects. Analogously, each of the deconvolutional layers O-R perform an upsampling operation on its input, with the consequence that the sixth through ninth feature maps F-I have progressively larger resolutions and are used for detection of progressively smaller objects.

Because semantic strength of the feature maps E-I generally increases with further processing by the deconvolutional layers O-R, the semantic strength of the ninth feature map, which is used for detection of relatively small objects, is higher than the semantic strength of the fifth feature map, which is used for detection of relatively large objects. It would be beneficial if all of the feature maps E-I used for object detection could instead benefit from the increased semantic strength resulting at least in part from the deconvolutional layers O-R.

At least some example embodiments herein address this problem by performing object detection on feature maps of different resolutions that are derived from a feature map that has relatively high semantic strength. For example, instead of performing object detection on four feature maps of different resolutions and different semantic strengths, in at least some example embodiments the feature map having the highest resolution and that has been processed by the most number of deconvolutional layers is used to generate different feature maps of different resolutions for use in detection of objects of different sizes. In this way, the different feature maps on which object detection is performed enjoy the benefit of the semantic strength of that highest resolution feature map. Further, a channel-wise split and pooling may be used to generate the feature maps on which object detection is performed from that highest resolution feature map. The channel-wise split and pooling is relatively computationally efficient relative to other methods in which different feature maps of relatively high semantic strength may be generated, such as through processing using additional convolutional and/or deconvolutional layers.

Figure 3:
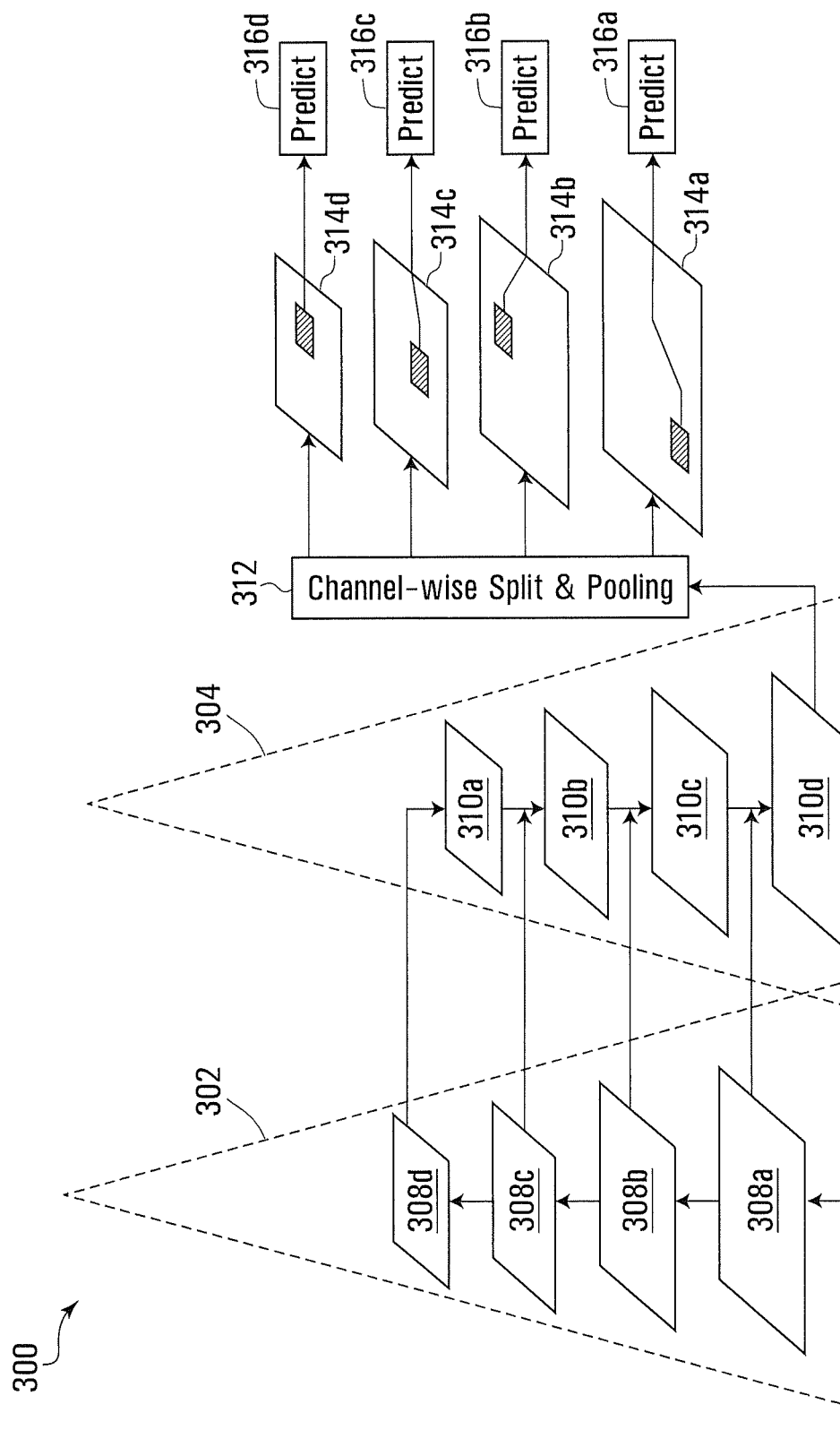
FIG. 3 illustrates a block diagram of a system for performing object detection using a convolutional neural network, according to at least some example embodiments.

Referring now to FIG. 3, there is shown a block diagram of a system 300 for performing object detection on an image 306 using a CNN, according to at least some example embodiments. The CNN comprises a first feature pyramid 302 connected in series with a second feature pyramid 304. First through fourth convolutional layers (not shown in FIG. 3 for the purpose of clarity) are connected in series. The image 306 is input to the first convolutional layers, and the first through fourth convolutional layers process the image 306 to generate first through fourth feature maps 308a-d, respectively; the first through fourth feature maps 308a-d comprise the first feature pyramid 302. Each of the convolutional layers increase the semantic strength of the feature map 308a-c it processes. Further, each of the convolutional layers perform a downsampling operation on their input, such as a pooling operation, with the consequence that the first through fourth feature maps 308a-d have progressively smaller resolutions and are used for detection of progressively larger objects.

First through third deconvolutional layers (not shown in FIG. 3 for the purpose of clarity) are also connected in series. The fourth feature map 308d of the first feature pyramid 302 is used as a first feature map 310a of the second feature pyramid 304, and is input to the second feature pyramid's 304 first deconvolutional layers. Second through fourth feature maps 310b-d of the second feature pyramid 304 are generated as a combination of the outputs of the first through third deconvolutional layers and a feature map 308a-c of the first feature pyramid at a height that corresponds to the heights of the second through fourth feature maps 310b-d, respectively; the first through fourth feature maps 310a-d comprise the second feature pyramid 304. In at least some example embodiments, the "combination" of the feature maps 308a-c of the first feature pyramid 302 with the outputs of the deconvolutional layers is a channel-wise concatenation of maps, with the maps 310b-d output by the deconvolutional layers being upsampled relative to those layers' inputs. In at least some example embodiments, the result of the channel-wise concatenation is that the feature map that results from that concatenation has a number of channels equal to the sum of the channels of the feature maps that were concatenated together. Each of the deconvolutional layers perform an upsampling operation on their input, with the consequence that the second through fourth feature maps 310b-d have progressively larger resolutions and are used for detection of progressively smaller objects. In at least some example embodiments, the number of channels of the feature map each of the layers output is less than a number of channels of the feature map input to them, with the decrease in channels being related to the increase in resolution during deconvolution. The fourth feature map 310d of the second feature pyramid 304 is at least tied for the highest, and in some example embodiments has the highest, semantic strength of the maps comprising the second pyramid 304, and represents a combination of the feature maps 310a-c that are sized for detection of larger objects. Each of the second through fourth feature maps 310b-d is an "enhanced map" in view of its increased semantic strength relative to the map 310a-c that is input to the deconvolutional layers.

The system 300 further comprises a channel-wise split and pooling module 312, to which the most enhanced of the feature maps 310b-d, the fourth feature map 310d, is input. Although the fourth map 310d is input to the split and pooling module 312, in at least some different example embodiments (not depicted) any of the other enhanced feature maps 310b,c may be so input. The split and pooling module 312 splits the enhanced feature map 310d into channel feature maps 314a-d, with each of the channel feature maps 314a-d corresponding to channels of the fourth feature map 310d and having a different resolution to facilitate detection at different object sizes. Following generation of the channel feature maps 314a-d, first through fourth detection modules 316a-d are used to detect objects of different sizes on the first through fourth channel feature maps 314a-d, respectively; example modules 316a-d comprise, for example, one or more convolutional and/or softmax layers. In at least some example embodiments, a sigmoid layer may be used instead of a softmax layer. Each of the feature maps 308a-d,310a-d,314a-d has a resolution defined by a height and a width, and a number of channels defined by a depth.

In FIG. 3, the CNN increases in depth with increasing height of the first pyramid 302 and decreasing height of the second pyramid 304. That is, in FIG. 3, the first feature map 308a is the shallowest feature map of the CNN, the fourth feature map 310d is the deepest feature map of the CNN, and depth increases progressively from the first feature map 308a at the base of the first pyramid 302, to the fourth feature map 308d at the top of the first pyramid 308d, to the first feature map 310a at the top of the second pyramid 310a, and to the fourth feature map 310d at the bottom of the second pyramid 310d.

Figure 4:
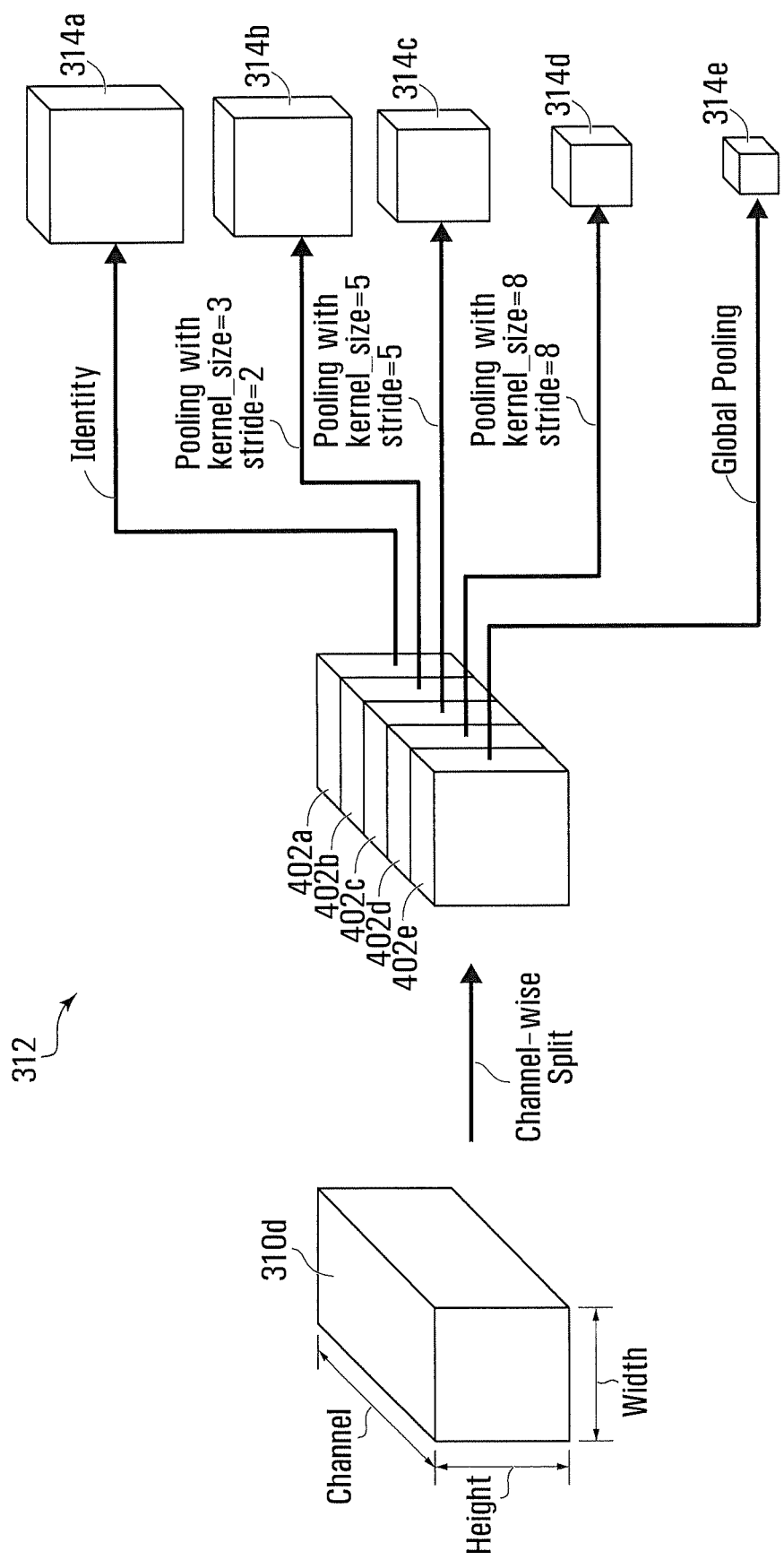
FIG. 4 illustrates a block diagram of a module for performing a channel-wise split, which comprises part of the system of FIG. 3.

Referring now to FIG. 4, there is shown a block diagram of the split and pooling module 312, according to at least some example embodiments. The fourth feature map 310d is input to the module 312, and is divided into its first through fifth constituent groups of channels 402a-e, each of which is differently pooled: the first group of channels 402a is unpooled, resulting in the first channel feature map 314a; the second group of channels 402b is pooled with a kernel size of 3 and a stride of 2, resulting in the second channel feature map 314b; the third group of channels 402c is pooled with a kernel size of 5 and a stride of 5, resulting in the third channel feature map 314c; the fourth group of channels 402d is pooled with a kernel size of 8 and a stride of 8, resulting in the fourth channel feature map 314d; and the fifth group of channels 402e is globally pooled, resulting in a fifth channel feature map 314e. While average pooling is used in FIG. 4, in at least some different embodiments max pooling, or a combination of average and max pooling for different channels 402a-e, may be used. The larger the kernel and stride used for pooling, the smaller the resulting channel feature map 314a-e, and the larger the object that the map 314a-e is used for detecting.

Figure 7:
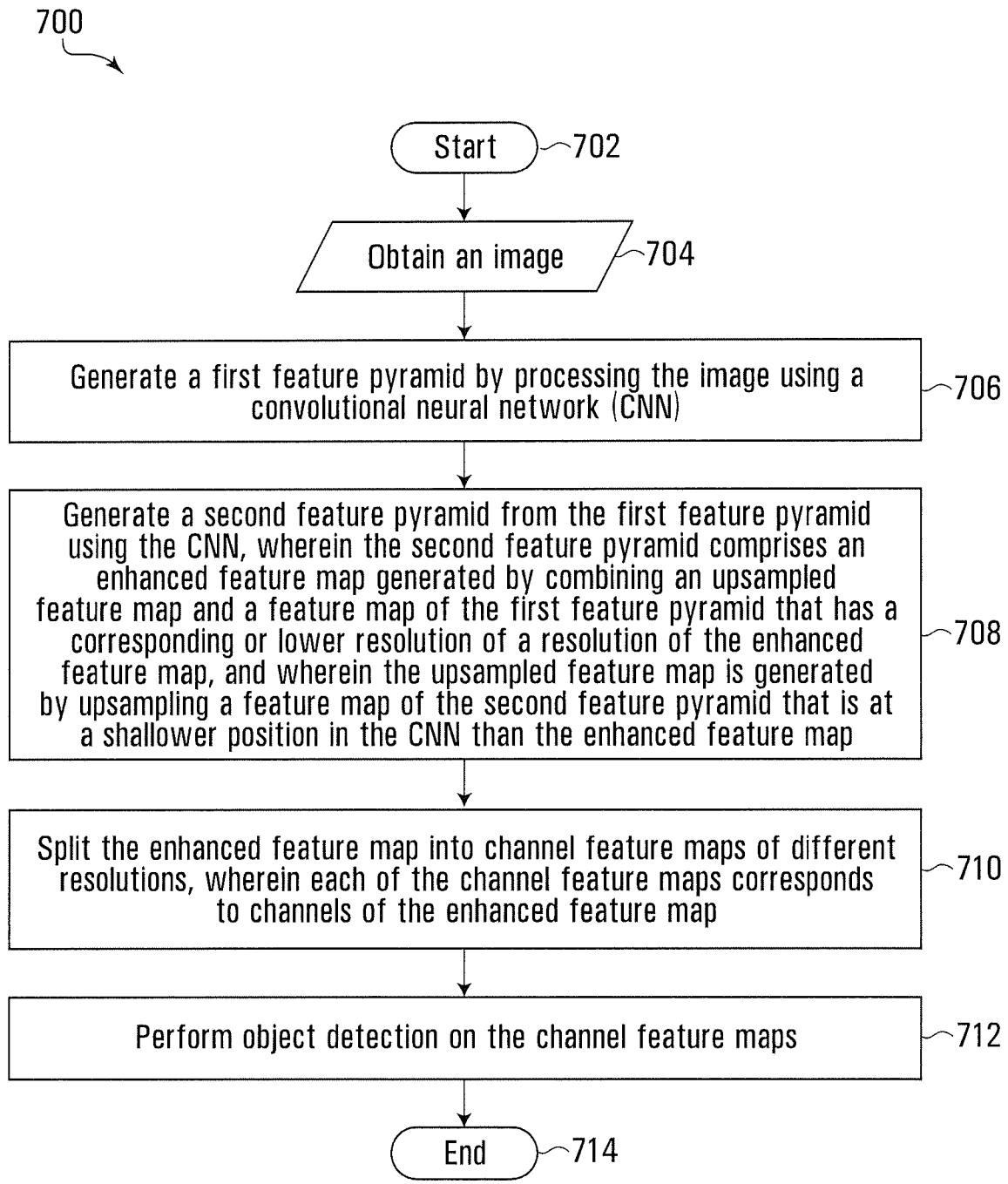
FIG. 7 illustrates a flowchart depicting a method for performing object detection using a convolutional neural network, according to at least some example embodiments.

The system 300 of FIG. 3 may be used in accordance with an example method 700 for performing object detection using a CNN as shown in FIG. 7. The method 700 may be performed, for example, by the video analytics module 224 resident on one of the cameras 108. Additionally or alternatively, the method 700 may be performed on another suitable processor, such as the processor comprising part of the workstation 156 or client devices 164. Furthermore, the method 700 may in some example embodiments be performed by one or more processors on a single device, such as the camera 108, and in other example embodiments be performed in a distributed manner across multiple devices, such as any two or more of the camera 108, workstation 156, and client device 164. In at least the example embodiment described below, the method 700 is performed by the video analytics module 224 on the camera 108.

The method 700 starts at block 702 and proceeds to block 704 where the video analytics module 224 obtains the image 306. The image 306 may be part of a video and may be obtained, for example, from the video capture module 208 if the image 306 is being obtained in real-time from the image sensor 116, or from the storage 240 if a stored image is to be analyzed.

Once the image 306 is obtained, the module 224 proceeds to block 706 where it generates the first feature pyramid 302 by processing the image 306 using a CNN. The semantic strength of the feature maps 308 comprising the first feature pyramid 302 increase with pyramid height as described above in respect of FIG. 3.

After the first feature pyramid 302 is generated at block 706, the module 224 proceeds to block 708 and generates the second feature pyramid 304 from the first feature pyramid 302 using the CNN. The second feature pyramid 304 comprises at least one enhanced feature map, such as each of the second through fourth feature maps 310$b$-$d$ of FIG. 3, that is generated by combining an upsampled feature map and a feature map 308 of the first pyramid 302 that has a corresponding or lower resolution of the enhanced feature map. In the example of FIG. 3, the feature map 308 of the first pyramid 302 is at a corresponding or higher height of a height of the enhanced feature map. The upsampled feature map is generated by upsampling, such as through deconvolution, a feature map 310 of the second feature pyramid 304 that is at a shallower position in the CNN than the enhanced feature map. For example, in FIG. 3, generating an enhanced feature map in the form of the third feature map 310$c$ comprises upsampling the second feature map 310$b$, which is higher in the pyramid 304 and shallower in the CNN than the third feature map 310$c$, and combining the upsampled, second feature map 310$b$ with the second feature map 308$b$ of the first feature pyramid 302.

Once the enhanced feature map is generated at block 708, the module 224 proceeds to block 710 and splits the enhanced feature map into the channel feature maps 314, which have different resolutions, using the split and pooling module 312. Each of the channel feature maps 314 corresponds to channels of the enhanced feature map. While in FIG. 3 the fourth feature map 310$d$, which is the lowest in the pyramid 304, is the enhanced feature map that is split and pooled, in at least some different example embodiments a different feature map 310 may be split and pooled. For example, the third feature map 310$c$ may be split and pooled to form the second through fourth channel feature maps 314$b$-$d$, and a larger feature map having the resolution of the first channel feature map 314$a$ may be generated by performing a deconvolution operation on the second channel feature map 314$b$.

Following the split and pooling, the module 224 performs object detection on each of the channel feature maps 314 at block 712, following which the method 700 ends at block 714.

Figure 6A:
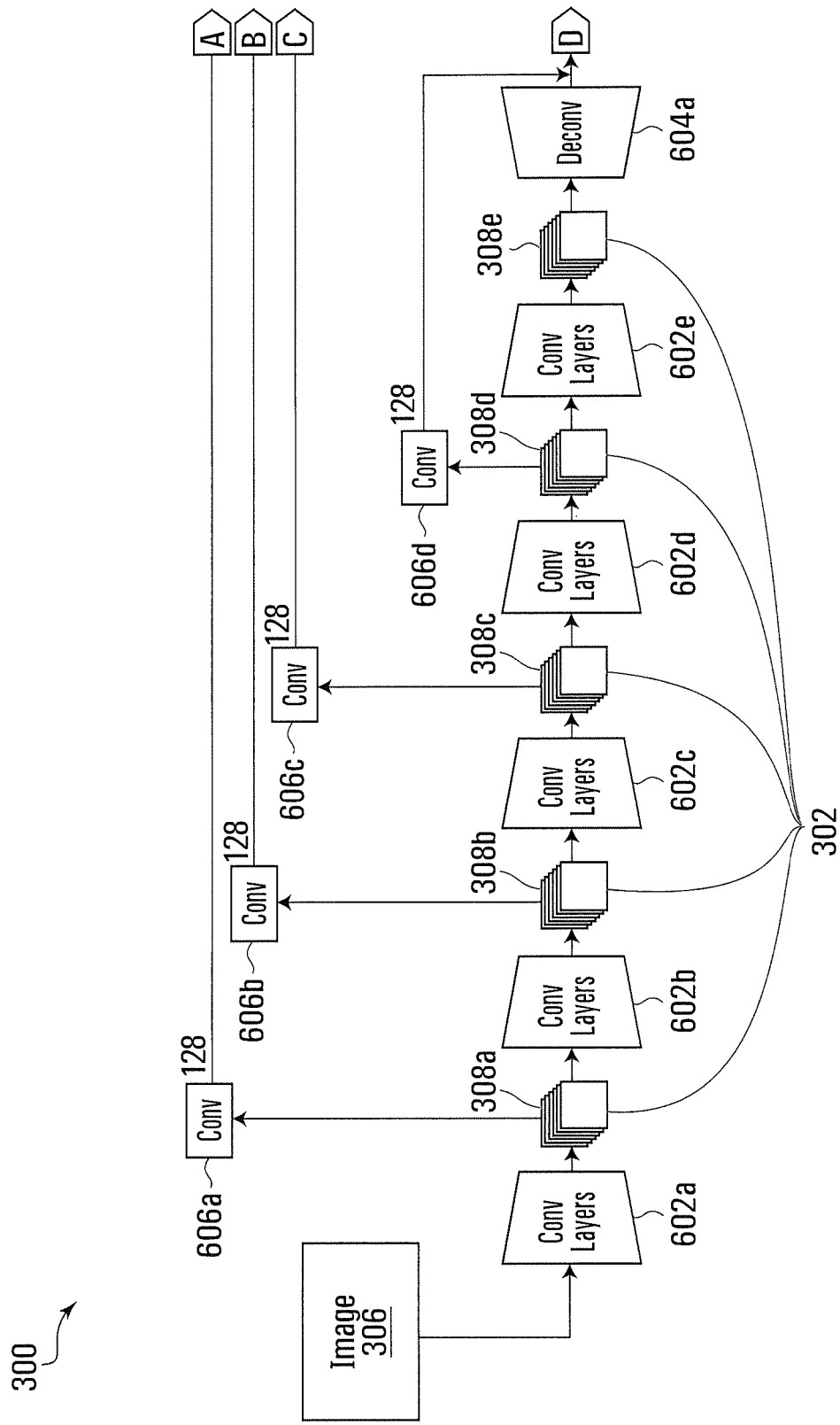
FIGS. 6A and 6B illustrate a block diagram of a system for performing object detection using a convolutional neural network, according to at least some example embodiments.
Figure 6B:
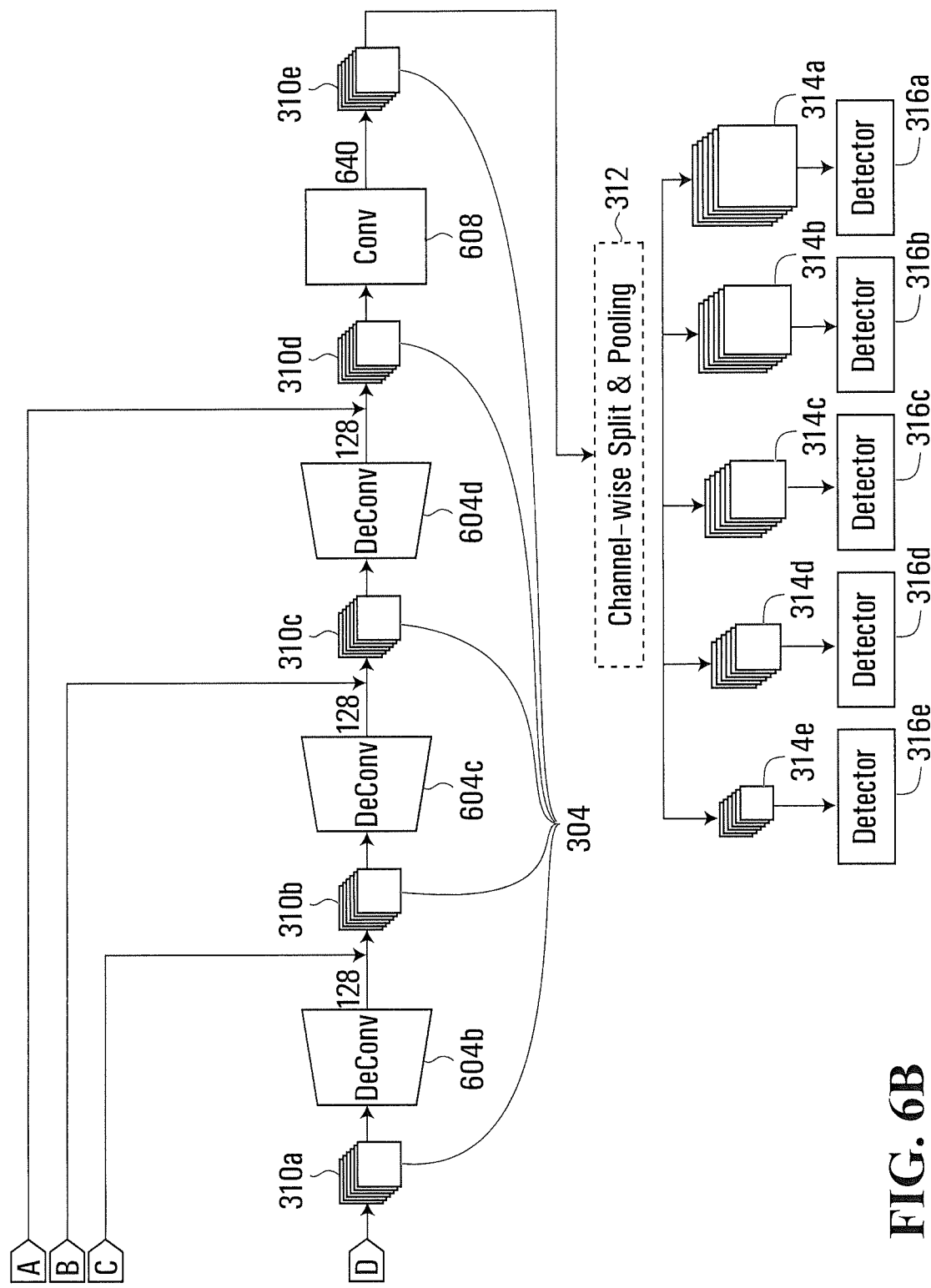

In order to test the method 700, the method 700 was implemented on the embodiment of the system 300 depicted in FIGS. 6A and 6B. Analogous to the embodiment of the system 300 of FIG. 3, the system 300 of FIGS. 6A and 6B comprises first through fifth convolutional layers 602$a$-$e$ connected in series. The image 306 is input to the first convolutional layers 602$a$, and the first through fifth convolutional layers 602$a$-$e$ respectively output first through fifth feature maps 308$a$-$e$ of the first feature pyramid 302 that progressively increase in semantic strength. Each of the convolutional layers 602$a$-$e$ downsample their input, and hence the first through fifth feature maps 308$a$-$e$ become progressively smaller. First through fourth convolution modules 606$a$-$d$ respectively perform convolutions on the first through fourth feature maps 308$a$-$d$. The system 300 also comprises first through fourth deconvolutional layers 604$a$-$d$ connected in series with the fifth convolutional layer 602$e$. The fifth feature map 308$e$ is input to the first deconvolutional layer 604$a$, and the outputs of the first through fourth deconvolutional layers 604$a$-$d$ are combined, using a channel-wise concatenation, with the outputs of the first through fourth convolution modules 606$a$-$d$ to create first through fourth feature maps 310$a$-$d$. The fourth feature map 310$d$ is passed through another convolution module 608 to produce a fifth feature map 310$e$, which is the enhanced feature map that is input to the split and pooling module 312. The first through fifth feature maps 310$a$-$e$ comprise the second feature pyramid 304.

Each of the feature maps 308$a$-$e$ immediately following processing by the convolution modules 606$a$-$d$ is 128 channels; each of the feature maps as immediately output by the deconvolutional layers 604$a$-$d$ comprises 128 channels; and each of the feature maps 310$a$-$d$ immediately following the channel-wise concatenation is accordingly 256 channels. The first through fourth convolution modules 606$a$-$d$ adjust the number of channels of the first through fourth feature maps 308$a$-$d$ as necessary to 128 without changing their resolution; the fifth convolutional layers 602$e$ output the fifth feature map 308$e$ with 256 channels, which is fed directly to the first deconvolutional layers 604$a$, which output a feature map of 128 channels as noted above. The convolution module 608 adjusts as necessary the number of channels of the fourth feature map 310$d$ to a desired number of channels to be input to the split and pooling module 312. For example, in the example embodiment of FIGS. 6A and 6B, each of the channel feature maps 314$a$-$e$ is desired to be 128 channels; consequently, the convolution module 608 adjusts the number of channels of the fourth feature map 310$d$ from 256 to generate the fifth feature map 310$e$, which has 640 channels (128×5 channel feature maps 314$a$-$e$), without changing the resolution of the fourth feature map 310$d$. The split and pooling module 312 then outputs first through fifth channel feature maps 314$a$-$e$ on which object detection is performed by first through fifth detector modules 316$a$-$e$, respectively, in a manner analogous to that described in respect of FIG. 3 above. In at least some example embodiments, one or more of the deconvolutional layers 604$a$-$d$ may perform deconvolution without adjusting the number of channels of the feature maps 308$e$,310$a$-$c$. Further in at least some example embodiments such as that depicted in FIG. 3, the fourth feature map 310$d$ may be input directly to the split and pooling module 312 without having its number of channels adjusted.

Testing

Performance of the system 300 of FIGS. 6A and 6B was compared against the prior art DSSD of FIGS. 5A and 5B using two tests. In a first test, testing data containing a combined 7,091 images of persons and vehicles were processed using the DSSD and the system 300. Their performances were evaluated using the Pascal VOC mAP score, which is an industry accepted metric for measuring object detection performance. In a second test, a combined 342 videos of persons were processed using the DSSD and the system 300, and precision and recall were used as performance metrics.

In the first test, the DSSD of FIGS. 5A and 5B achieved a mAP score of 50.53% for persons, and 76.64% for vehicles, while the system 300 of FIGS. 6A and 6B achieved a mAP score of 51.37% for persons and 77.71% for vehicles. In the second test, the DSSD of FIGS. 5A and 5B had a precision score for persons of 65.51% and a recall score for persons of 35.32%. In contrast, the system 300 of FIGS. 6A and 6B had a precision score for persons of 68.63% and a recall score for persons of 35.94%.

Precision and recall are inversely related with all other things being equal, as one increases while the other decreases in response to a change in a user-defined confidence threshold. Consequently, the material increase in the system's 300 precision score for persons without suffering any decrease in its recall score for persons compared to the DSSD emphasizes the superior performance of the system 300 compared to a conventional DSSD.

While the above description provides examples of the embodiments, it will be appreciated that some features and/or functions of the described embodiments are susceptible to modification without departing from the spirit and principles of operation of the described embodiments. For example, while the above example embodiments comprise the first and the second feature pyramids 302,304, at least some different example embodiments may comprise only a single feature pyramid (e.g., comprising convolutional layers without deconvolutional layers) or three or more feature pyramids (e.g., comprising only convolutional layers, or multiple convolutional and/or multiple deconvolutional layers). In at least some of these example embodiments, the channel-wise split may be performed on any of the feature maps of the CNN whose semantic strength has been increased by at least one convolutional layer (e.g., the CNN comprises at least one feature map shallower than the enhanced feature map on which the channel-wise split is performed).

It is contemplated that any part of any aspect or embodiment discussed in this specification can be implemented or combined with any part of any other aspect or embodiment discussed in this specification.

Accordingly, what has been described above has been intended to be illustrated non-limiting and it will be understood by persons skilled in the art that other variants and modifications may be made without departing from the scope of the invention as defined in the claims appended hereto.

The invention claimed is:

1. A camera comprising:
a housing through which extends an aperture that permits light to enter the housing;
an image sensor contained within the housing to receive the light that has entered the housing through the aperture;
a processor communicatively coupled to the image sensor; and
a memory communicatively coupled to the processor, wherein the memory has stored thereon computer program code that is executable by the processor and that, when executed by the processor, causes the processor to perform a method comprising:
obtaining an image;
generating a first feature pyramid by processing the image using a convolutional neural network (CNN);
generating a second feature pyramid from the first feature pyramid using the CNN, wherein the second feature pyramid comprises an enhanced feature map generated by combining an upsampled feature map and a feature map of the first feature pyramid that has a corresponding or lower resolution of a resolution of the enhanced feature map, and wherein the upsampled feature map is generated by upsampling a feature map of the second feature pyramid that is at a shallower position in the CNN than the enhanced feature map;
splitting the enhanced feature map into channel feature maps of different resolutions, wherein each of the channel feature maps corresponds to channels of the enhanced feature map; and
performing object detection on the channel feature maps.

2. The camera of claim 1, wherein generating each of the feature maps of the second feature pyramid deeper than a shallowest feature map of the second feature pyramid comprises combining an upsampled version of a feature map of the second feature pyramid that is one layer shallower than the feature map being generated, and a feature map of the first feature pyramid that has an identical resolution of the feature map being generated.

3. The camera of claim 2, wherein a deepest feature map of the first feature pyramid and the shallowest feature map of the second feature pyramid are identical.

4. The camera of claim 2, wherein the shallowest feature map of the second feature pyramid is generated by processing a deepest feature map of the first feature pyramid using a convolutional layer of the CNN.

5. The camera of claim 1, wherein the first feature pyramid and the second feature pyramid are of identical height.

6. The camera of claim 1, wherein the feature map of the first feature pyramid used to generate the enhanced feature map is at a height of the first feature pyramid that corresponds to a height of the enhanced feature map.

7. The camera of claim 1, wherein the enhanced feature map is generated as a channel-wise concatenation of the upsampled feature map and the feature map of the first feature pyramid.

8. The camera of claim 1, wherein the enhanced feature map is generated as an element-wise sum of the upsampled feature map and the feature map of the first feature pyramid.

9. The camera of claim 1, wherein upsampling the feature map of the second feature pyramid comprises performing a deconvolution on the feature map of the second feature pyramid.

10. The camera of claim 1, wherein splitting the enhanced feature map into channel feature maps of different resolutions comprises differently pooling feature maps that result from splitting the enhanced feature map.

11. The camera of claim 1, wherein splitting the enhanced feature map into channel feature maps of different resolutions comprises performing different convolutional operations on feature maps that result from splitting the enhanced feature map.

12. The camera of claim 11, wherein the channel feature maps have identical resolutions to at least some feature maps of the second feature pyramid.

13. The camera of claim 1, wherein the enhanced feature map is at a base of the second feature pyramid.

14. The camera of claim 1, wherein the enhanced feature map is further generated by performing a convolution operation on a resulting feature map that results from combining the upsampled feature map and the feature map of the first feature pyramid that has a corresponding or lower resolution of a resolution of the enhanced feature map, wherein the convolution operation adjusts a number of channels of the resulting feature map.

15. A camera comprising:
- a housing through which extends an aperture that permits light to enter the housing;
- an image sensor contained within the housing to receive the light that has entered the housing through the aperture;
- a processor communicatively coupled to the image sensor; and
- a memory communicatively coupled to the processor, wherein the memory has stored thereon computer program code that is executable by the processor and that, when executed by the processor, causes the processor to perform a method comprising:
    - obtaining an image;
    - generating at least one feature pyramid by processing the image using a convolutional neural network (CNN);
    - splitting an enhanced feature map comprising part of the at least one feature pyramid into channel feature maps of different resolutions, wherein the CNN comprises at least one feature map that is shallower than the enhanced feature map, and wherein each of the channel feature maps corresponds to channels of the enhanced feature map; and
    - performing object detection on the channel feature maps.

16. The camera of claim 15, wherein the processor and memory are contained within the housing.

17. A non-transitory computer readable medium having stored thereon computer program code that is executable by a processor and that, when executed by the processor, causes the processor to perform a method comprising:
- obtaining an image;
- generating a first feature pyramid by processing the image using a convolutional neural network (CNN);
- generating a second feature pyramid from the first feature pyramid using the CNN, wherein the second feature pyramid comprises an enhanced feature map generated by combining an upsampled feature map and a feature map of the first feature pyramid that has a corresponding or lower resolution of a resolution of the enhanced feature map, and wherein the upsampled feature map is generated by upsampling a feature map of the second feature pyramid that is at a shallower position in the CNN than the enhanced feature map;
- splitting the enhanced feature map into channel feature maps of different resolutions, wherein each of the channel feature maps corresponds to channels of the enhanced feature map; and
- performing object detection on the channel feature maps.

18. A non-transitory computer readable medium having stored thereon computer program code that is executable by a processor and that, when executed by the processor, causes the processor to perform a method comprising:
- obtaining an image;
- generating at least one feature pyramid by processing the image using a convolutional neural network (CNN);
- splitting an enhanced feature map comprising part of the at least one feature pyramid into channel feature maps of different resolutions, wherein the CNN comprises at least one feature map that is shallower than the enhanced feature map, and wherein each of the channel feature maps corresponds to channels of the enhanced feature map; and
- performing object detection on the channel feature maps.

* * * * *